UNITED STATES PATENT OFFICE.

EMIL VON PORTHEIM, OF SMICHOW, NEAR PRAGUE, AUSTRIA-HUNGARY.

MANUFACTURE OF ANHYDROUS HYDROSULFITES.

1,166,160.  Specification of Letters Patent.  Patented Dec. 28, 1915.

No Drawing.  Application filed June 12, 1913. Serial No. 773,226.

*To all whom it may concern:*

Be it known that I, EMIL VON PORTHEIM, subject of the Emperor of Austria-Hungary, residing at Smichow, near Prague, No. 67, Austria-Hungary, have invented new and useful Improvements in the Manufacture of Anhydrous Hydrosulfites, of which the following is a specification.

The specification of Patent No. 1,036,705 claims the production of anhydrous hydrosulfites by suitably causing formic acid or formates to react with sulfurous acid or its salts, while excluding the presence of water.

It has now been found that anhydrous sodium hydrosulfite can be obtained in better yield and in a higher state of purity than according to the aforesaid Letters Patent by causing sodium formate and sodium pyrosulfite, or sodium bisulfite, which is equivalent to sodium pyrosulfite to react in the presence of moderately dilute alcohol containing less than 90% and preferably not less than about 70% by weight of alcohol, while employing sodium as the sole salt-forming base.

The following examples will serve to illustrate further the nature of this invention, which, however, is not confined to these examples.

Example 1: Dissolve 68 kilos of sodium formate of 100% and 51.5 kilos of 91% formic acid in 1950 liters of dilute alcohol containing 84% by weight of alcohol. Then add 160 kilos of sodium pyrosulfite and heat, while stirring, to about 70° C. Maintain this temperature for about 3½ hours, or until a test portion shows that the reaction is finished. Then filter off the hydrosulfite and dry it *in vacuo*.—In this example, a more dilute alcohol can be employed and good yields of high percentage hydrosulfite can be obtained until a concentration of about 70% by weight of alcohol is reached, under which concentration the yield becomes inferior. Instead of sodium pyrosulfite, sodium bisulfite which has been precipitated from its aqueous solution by means of alcohol can be used.

Example 2: Allow a solution of 82 kilos of 98% sodium formate and 50 kilos of 91% formic acid in 200 liters of water to flow into 1,800 liters of 95% alcohol. Then add, while well stirring, 194 kilos of 98% sodium pyrosulfite and heat for 3 hours at 70° C., and during this time pass a current of sulfur dioxid into the mixture, so that altogether about 17 kilos thereof are led in. Then cool to about 50° C., filter off with the aid of the pump, wash well with pure alcohol and dry *in vacuo*.

Example 3: Heat, for about 3 hours, at from 65° to 70° C., 68 kilos of sodium formate, 104 kilos of sodium bisulfite which has been precipitated by means of alcohol, and 1,300 liters of alcohol of 80% by weight, while passing into the mixture about 50 kilos of sulfur dioxid. Then work up as described in the foregoing examples.

Now what is claimed is:—

1. The process of producing anhydrous sodium hydrosulfite which comprises reacting on sodium formate with sodium pyrosulfite in the presence of dilute alcohol containing less than 90% and preferably not less than 70% by weight of pure alcohol.

2. The process of producing anhydrous sodium hydrosulfite which comprises reacting on a mixture containing sodium formate and formic acid with sodium pyrosulfite in the presence of dilute alcohol containing less than 90% and preferably not less than 70% by weight of pure alcohol.

3. The process of producing anhydrous sodium hydrosulfite which comprises reacting on a mixture containing sodium formate, formic acid and sodium pyrosulfite with sulfurous acid in the presence of dilute alcohol containing about 75% to 80% by weight of pure alcohol.

4. The process of producing anhydrous sodium hydrosulfite which comprises reacting on a mixture containing sodium formate and sodium pyrosulfite with sulfurous acid in the presence of dilute alcohol containing about from 75% to 80% by weight of pure alcohol.

In testimony whereof I have hereunto set my hand in the presence of two subscribing witnesses.

EMIL VON PORTHEIM.

Witnesses:
ADOLPH FISCHER,
JOHN L. BRUCHAL.